United States Patent [19]

Myhre

[11] Patent Number: 4,525,081
[45] Date of Patent: Jun. 25, 1985

[54] VIBRATION DAMPENED BEAM

[75] Inventor: Douglas C. Myhre, Eden Prairie, Minn.

[73] Assignee: Rosemount Inc., Eden Prairie, Minn.

[21] Appl. No.: 531,218

[22] Filed: Sep. 9, 1983

[51] Int. Cl.³ .......................... G01K 1/08; G01K 1/14
[52] U.S. Cl. .................................. 374/208; 73/432 R; 267/141.2
[58] Field of Search ............... 73/432 B; 374/147, 148, 374/208; 188/378, 379; 267/141, 14.2

[56] References Cited

U.S. PATENT DOCUMENTS 2,838,935  6/1958  Cecio et al. .......................... 374/258

Primary Examiner—S. Clement Swisher
Attorney, Agent, or Firm—Kinney & Lange

[57] ABSTRACT

A vibration dampening system comprises a beam 28 which has an unsupported length and is affixed to a supporting structure 12. The supporting structure 12 is subject to vibrations which may be transmitted to the beam 28. A sheath 42 is rigidly mounted to the supporting structure 12. The sheath 42 substantially encloses a portion of the beam 28 and is spaced from the beam 28. An elastomeric dampener 46 is disposed between the beam 28 and the sheath 42. The elastomeric dampener 46 and the sheath 42 dampen vibrations of the beam 28.

15 Claims, 4 Drawing Figures

VIBRATION DAMPENED BEAM

BACKGROUND OF THE INVENTION

1. Field of the Invention

The present invention relates to an improved sensor that is vibration dampened.

2. Prior Art

In the prior art, a number of devices that combine an elastomeric member with a suitable structural member have been advanced for the purpose of shock isolation or vibration isolation. It has been the object of such devices to prevent the transmission of shock or vibration from one structure to another. The present invention is conceptually remote from such prior art. A device made according to the present invention is designed to dampen the vibration in a structure, the beam, by partially supporting such structure with an elastomeric member held in a rigid supporting second structure, the sheath, in order to reduce the amplitude of vibrations in the first structure. Such use is not known in the prior art. Typical prior art devices, are shown in U.S. Pat. Nos. 3,719,349; 4,187,668 and 4,363,217.

A device made according to the present invention is useful where an elongated beam having an unsupported length is required and such beam is mounted on a structure subject to vibration. In an embodiment, the beam comprises a sensor body that is cantilever in construction. Such a device may comprise for example a temperature sensor in a bleed air duct from an aircraft engine. With a relatively thin beam of steel tube construction and approximately five inches in length measured from the point of mounting to the vibrating structure, it has been shown that a vibrational input equal to six times the acceleration of gravity (6 g's) normal to the longitudinal axis of the sensor body results in acceleration levels at the unsupported end of the sensor body that may reach in excess of 4000 peak g's (4,000 times the acceleration of gravity) at the tip of the sensor body. Normal practice where the beam comprises an elongated sensor body is to dispose the sensor element of the sensor close to the unsupported tip end of the sensor body. Accelerations as indicated above are harmful to such sensor elements and can drastically reduce the useful life of the sensor. Accordingly it is desirable to reduce the effects of the structural vibrations on the sensor body, particularly with respect to the unsupported end of the sensor body. It has been shown that a device made according to the present invention is effective in reducing such accelerations by a factor of up to 20.

SUMMARY OF THE INVENTION

A vibration dampening system comprises a beam which has an unsupported length and is affixed to a supporting structure. The supporting structure is subject to vibrations which may be transmitted to the beam. A sheath is rigidly mounted to the supporting structure. The sheath substantially encloses a portion of the beam and is spaced from the beam. An elastomeric dampener is disposed between the beam and the sheath. The elastomeric dampener and the sheath dampen vibrations of the beam.

An application of the invention is in a sensor wherein the beam comprises an elongated sensor body that houses a sensor element.

In a preferred embodiment the elastomeric dampener comprises at least one preformed elastomer formed, for example of either fluorocarbon, fluorosilicone or silicone, and disposed proximate the end of the sheath that is furthest from the mounting to the supporting structure. In a further preferred embodiment the elastomeric dampener comprises a room temperature vulcanizing elastomer that substantially fills the cavity formed between the sensor body and the sheath.

DESCRIPTION OF THE PREFERRED EMBODIMENTS

Figure 1:
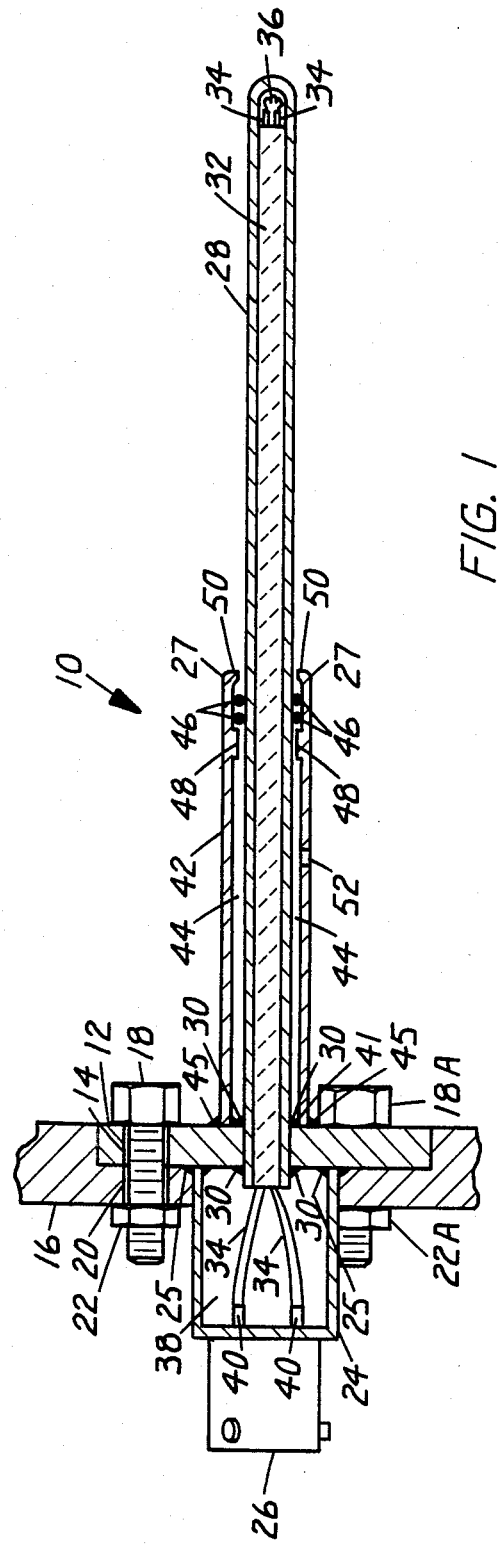
FIG. 1 is a side view, taken in section, of a sensor made according to the present invention wherein the preformed elastomeric dampener comprises two O rings.

FIG. 1 shows sensor 10 which is designed to be mounted by base 12 flush in wall 16 of a supporting structure. Sensor 10 may be rigidly secured to wall 16 by passing a conventional bolt-type fastener 18 through bolthole 14 and bolt hole 20 and secure fastener 18 to the supporting structure such as by nut 22. In a preferred embodiment, base 12 is disc-shaped. Two bolt holes in addition to bolt hole 14 are equiangularly displaced from bolt hole 14 around base 12 for securing sensor 10 to the supporting structure. One such bolt 18A and nut 22A is shown. It is understood that other means of rigidly attaching base 12 to wall 16, such as brazing, welding, mating male and female threads or bonding may be used.

A portion of the sensor passes through wall 16. In the embodiment shown cap 24 is affixed to base 12 as by welding or brazing 25 and extends through wall 16. Attached to cap 24 is connector 26. Connector 26 has electrical pins therein for insertion in a mating quick disconnect type connector when such connector is mated to connector 26.

A beam, in this embodiment sensor body 28, is rigidly affixed to base 12 as for example by brazing or welding at 30. In the embodiment shown sensor body 28 is a tube of cantilever construction. As desired, ceramic dowel 32 is inserted in sensor body 28. Dowel 32 has leads 34 embedded therein and conveys such leads 34 from sensor element 36 to chamber 38 in cap 24. Leads 34 connect to pins 40 in chamber 38. Pins 40 feed through cap 24 and into connector 26 to provide electrical connection from sensor element 36 to a controller or the like which utilizes the data from the sensor element. It should be understood that other embodiments of a beam may be utilized with a device made according to the present invention.

Sensor body 28 has an elongated shape. In the embodiment shown sensor body 28 is a tube closed at the end containing sensor element 36 and having a circular cross section. For the purposes of this disclosure, the unsupported length of sensor body 28 is determined from the point of affixing to base 12 to the closed end. It is this length that is critical with respect to vibrations to base 12 that affect the sensor body 28. The length of sheath 42 is also determined from base 12. The length of sensor body 28 is many times the diameter of sensor body 28, thereby giving sensor body 28 its elongated shape. In a preferred embodiment, the length of sensor body 28 is more than 12 times the diameter.

Wall 16 may comprise the skin of an aircraft, wherein sensor body 28 projects into the free stream flow past the aircraft. In a desired useage, wall 16 comprises a portion of a vessel or conduit which contains a medium, a parameter of which is to be sensed. Sensor body 28 projects into the vessel or conduit. In a desired application, the conduit is a bleed air duct from a jet engine in which hot bleed air from the jet engine compressor flow. Sensor element 36 comprises a temperature sensor to measure the temperature of the bleed air. In a preferred embodiment, sensor body 28 is constructed of steel. Other construction materials are suitable, including for example nickel alloys and other metals.

Sheath 42 substantially encloses a portion of sensor body 28. Sheath 42 is rigidly affixed to base 12 as by welding or brazing at 45 and is substantially unaffected by vibrations normal to the longitudinal axis of sensor body 28. Other means of rigidly affixing sheath 42 to base 12 may be utilized. Sheath 42 extends a length from base 12 that is less than the unsupported length of sensor body 28 and is spaced from sensor body 28. In a preferred embodiment, sheath 42 is a tube, circular in cross section, having an inside diameter that is greater than the outside diameter of sensor body 28. First end 41 of sheath 42 is rigidly affixed to base 12. Second end 27 extends along sensor body 28 and is open, not being in contact with sensor body 28. In a preferred embodiment, the length of sheath 42 is between one-third and one-half the unsupported length of sensor body 28. Sheath 42 and sensor body 28 are preferably concentric and form cavity 44 therebetween.

Elastomeric dampener 46 is disposed in cavity 44 and is in contact with both sensor body 28 and sheath 42 and is preferably held in compression. In an embodiment, elastomeric dampener 46 is preferably located proximate to second end 27 of sheath 42 in order to minimize the length of sheath 42 while at the same time maximizing the distance from the point of mounting to base 12 that elastomeric dampener 46 acts upon sensor body 28. In the embodiment shown in FIG. 1, elastomeric dampener 46 is a preformed elastomer and specifically comprises a pair of O rings extending around the circumference of sensor body 28. In this embodiment, elastomeric dampener 46 is held in place by shoulder 48 which is formed on the inner surface of sheath 42 and projects inward toward sensor body 28. Additionally, second end 27 of sheath 42 is rolled or crimped, as desired, to form lip 50 to retain elastomeric dampener 46.

Elastomeric dampener 46 effectively forms a seal, sealing cavity 44 from the environment surrounding sensor 10. Where sensor 10 is subjected to temperature or pressure variations, a high or low pressure relative to the environment around sensor 10 may be created in cavity 44 due to heating or cooling of entrapped gas therein or by variations in the pressure of the environment. Such pressure differential is undesirable. When the pressure in cavity 44 is low with respect to the surrounding environment, it tends to draw elastomeric dampener 46 past shoulder 48 and further into cavity 44. When the pressure in cavity 44 is high relative to the environment, such pressure tends to expel elastomeric dampener 46 from cavity 44 by forcing it past lip 50. To solve this problem, port 52 passing through sheath 42 and located between elastomeric dampener 46 and the point of affixing of sheath 42 to base 12 is provided to equalize the pressure in cavity 44 and the pressure of the surrounding environment.

Figure 2:
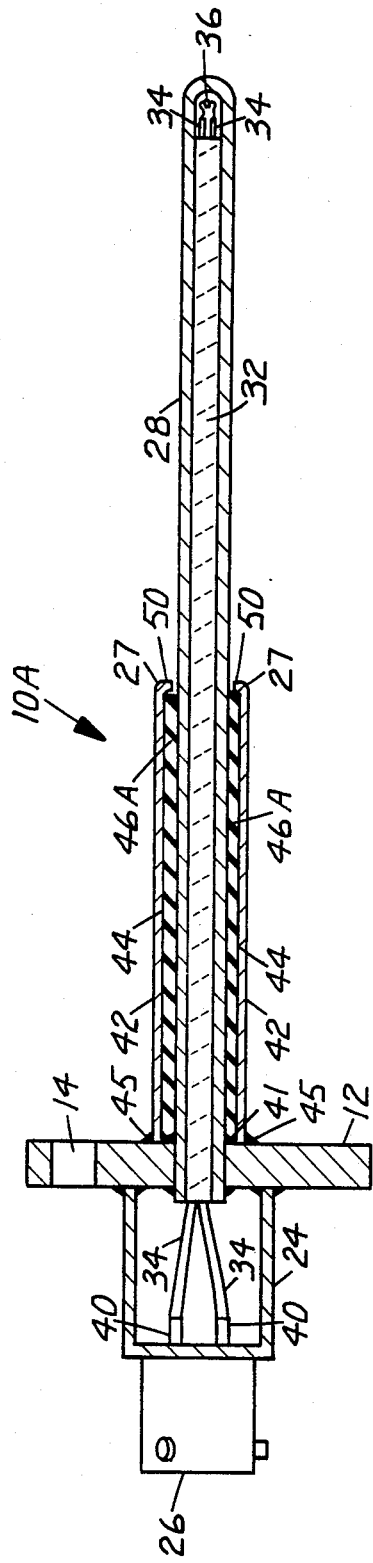
FIG. 2 is a side view taken in section of a sensor made according to the present invention wherein the elastomeric dampener comprises room temperature vulcanizing elastomer that fills the cavity formed between the sensor body and the sheath.

FIG. 2 shows another embodiment of a device made according to the present invention. All features of sensor of 10A in FIG. 2 correspond to similarly numbered features of sensor 10 in FIG. 1. Sheath 42 is rigidly mounted to base 12 and is substantially unaffected by vibrations normal to the longitudinal axis of sensor body 28. In FIG. 2, a room temperature vulcanizing (RTV) silicone rubber is introduced into cavity 44 past lip 50 of sheath 42 and comprises elastomeric dampener 46A. Elastomeric dampener 46A is forced into cavity 44 in a fluid state to substantially fill cavity 44. Thereafter, elastomeric dampener 46A vulcanizes in a known manner to give such dampener 46A the desired elastomeric characteristics.

Figure 3:
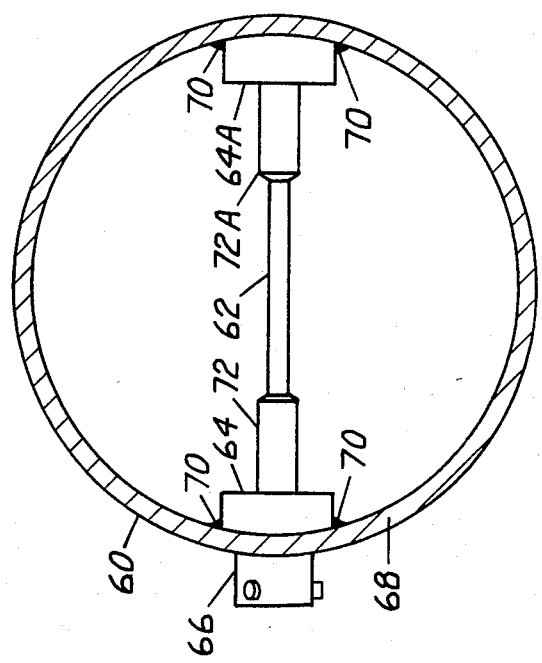
FIG. 3 is an end view of a conduit showing a device made according to the present invention that is mounted to the conduit at both ends of the sensor body and employs two sheaths for dampening.

FIG. 3 shows a sensor body that is not of cantilever construction but is mounted at both ends to a conduit and has an unsupported length therebetween. Conduit 60 is a vessel in which a medium flows, a parameter of which is to be sensed. FIG. 3 is an end view of conduit 60. Sensor body 62 is rigidly mounted to bases 64 and 64A as described in the description of FIG. 1. Connector 66 contains electrical connectors which pass through wall 68 of conduit 60 and are electrically connected to a sensor element mounted in sensor body 62. Bases 64 and 64A are rigidly mounted to wall 68 as, for example, by welding at points 70.

Vibrations substantially in the plane of bases 64 and 64A (normal to the longitudinal axis of sensor body 62) are imparted to sensor body 62. Dampening of such vibration is accomplished by a pair of sheaths 72 and 72A mounted rigid with respect to bases 64 and 64A respectively and substantially unaffected by such vibrations. Sheaths 72 and 72A are constructed as described in the descriptions sheaths 42 of FIGS. 1 and 2. The combined length of sheaths 72 and 72A is less than the unsupported length of sensor body 62. Elastomeric dampeners, as described in FIGS. 1 and 2 as elastomeric dampeners 46 and 46A, are utilized as desired in conjunction with sheaths 72 and 72A to effect dampening of vibrations in sensor body 62.

An important consideration in the fabrication of a device made according to the present invention is the hardness of the elastomeric dampener. Such hardness can be represented in terms of the known Durometer hardness numbers. The Durometer (Durometer is the generic term for both the instrument and the scale of value.) is the international standard for the hardness measurement of rubber, plastic, and other non-metallic materials. Type A Durometers, which are used on all rubber, soft plastic, leather, felt, etc., are described in the American Society for Testing and Material specification ASTM D2240, which is the recognized specification for the instrument and test procedures.

In a preferred embodiment, it has been determined that the desired dampening of the vibrations of the sensor body occurs where the Durometer hardness is between 60 and 95. It is important that such hardness exist under the operating conditions at which the sensor is desired to operate. A most important parameter of the operating conditions is temperature. It is known that temperature has a profound effect on the hardness of the materials utilized in construction of the elastomeric dampener. Accordingly, it is important that elastomeric dampener 46 have the desired hardness under the operating conditions at which the sensor is expected to perform.

Sheath 42, shown in FIG. 1, is substantially rigid compared to sensor body 28. This results from the larger diameter and shorter length of sheath 42 and the fact that the walls of sheath 42 may be thicker than the walls of sensor body 28. Accordingly, sheath 42 is substantially unaffected by vibrations in the plane of base 12 (normal to the longitudinal axis of sensor body 28) and accordingly sheath 42 rigidly supports elastomeric dampener 46.

In operation, the spring action of elastomeric dampener 46 absorbs a certain amount of the amplitude of vibrations of sensor body 28. The amount of vibrational amplitude absorbed is largely dependent on the hardness of elastomeric dampener 46. Conceptually, the harder that elastomeric dampener 46 is, the more similar the effect upon sensor body 28 is to rigidly supporting sensor body 28 at second end 27 of sheath 42. Conversely, the softer that elastomeric dampener 46 is the more similar its effect on sensor body 28 is to simply rigidly supporting sensor body 28 to base 12 without any dampening. This concept permits the vibrational system, comprising a beam, in this case sensor body 28, a sheath 42 and an elastomeric dampener 46, to be tuned to optimize its response to vibrational inputs at base 12. Such tuning is accomplished by knowing principally the resonant frequencies of the supporting structure and the vibrational level as expressed in peak forces of gravity, $g_{peak}$. The variables that exist to deal with this are essentially the hardness of elastomeric dampener 46 and the distance from base 12 that elastomeric dampener 46 acts upon sensor body 28. Preferably such distance approximates the length of sheath 42.

Figure 4:
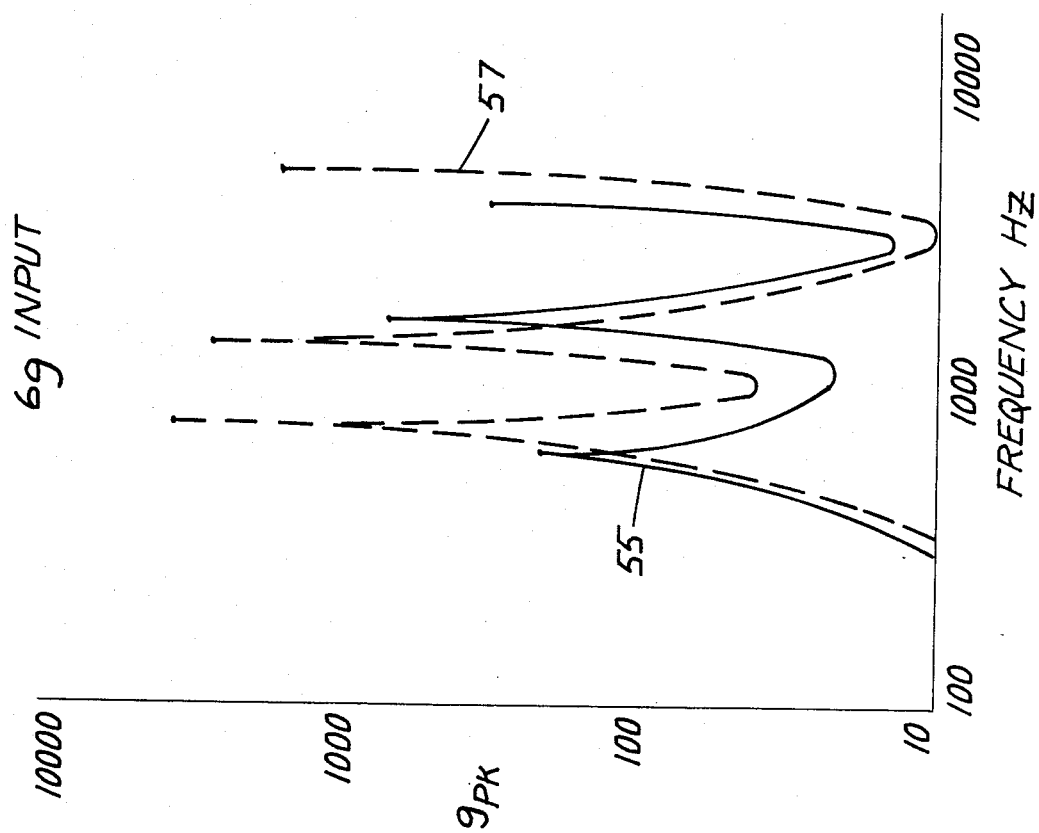
FIG. 4 is a logarithmic graph of accelerations of gravity (g) measured at the end of the sensor body on the vertical axis versus frequency of vibration in Hertz on the horizontal axis and showing a first curve representative of the response of a device made according to the present invention and a second curve representative of a similar sensor body without the sheath or elastomeric dampener. The input is 6g accelerations at the base of the sensor body normal to the longitudinal axis of the sensor body.

An example of the effect of a device made according to the present invention as illustrated in FIG. 1 is shown in FIG. 4. Two curves are shown. Solid curve 55 shows a sensor body damped by a sheath and elastomeric dampener made according to the present invention as shown in FIG. 1. Dashed curve 57 shows the same sensor body in its undamped condition. In both cases the input vibration is 6 $g'_{speak}$ at the base and in the plane of the base (normal to the longitudinal axis of sensor body 28). It is important to keep in mind that the graph is a logarithmic representation. The differences between the dampened and undampened conditions would be considerably more dramatic if shown on a linear graph. Each curve has three peaks corresponding to the first, second and third vibrational harmonics. For the undampened condition shown by curve 57, such harmonic points are at 4400, 3000 and 1700 $g'_{speak}$ for the first, second and third harmonics, respectively. The dampened condition for the same sensor body shown by curve 55 has harmonic points of 220, 750 and 330 $g'_{speak}$ for the first, second and third harmonics, respectively. FIG. 4 clearly shows the beneficial effect of a device made according to the present invention on sensor body vibrations. With respect to the first harmonic, the dampening results in a 20 fold reduction in the peak vibrational accelerations measured at the unsupported end of sensor body 28.

What is claimed is:

1. A vibration dampening system for supporting an elongated temperature sensor comprising elongated temperature sensor means having an unsupported length and affixed on at least one end to a supporting structure, the supporting structure being subject to vibrations which may be transmitted to the temperature sensor means, sheath means rigidly mounted to the supporting structure at each end of the temperature sensor means which is supported on said supporting structure, the sheath means being subjected to vibrations of the supporting structure, the sheath means substantially surrounding a corresponding portion of the temperature sensor means and being spaced therefrom, elastomeric dampening means disposed between the beam means and the sheath means at each end where the temperature sensor means is to be supported to couple such end of the temperature sensor means to the supporting structure, the sensor means being supported to the supporting structure only adjacent to sheath means supported to the supporting structure, the elastomeric dampening means and the corresponding sheath means dampening vibrations of the temperature sensor means adjacent each support for the temperature sensor means to the supporting structure in direction generally perpendicular to the longitudinal axis of the elongated temperature sensor means.

2. An improved sensor having an elongated sensor body having a certain unsupported length and which is rigidly mounted at at least one point to a supporting structure subject to vibrations wherein the improvement comprises:
   at least one sheath means rigidly mounted to the supporting structure and substantially enclosing a portion of the sensor body and spaced from the sensor body and having a second end defining a length that is less than the unsupported length of the sensor body so that the sensor body extends outwardly beyond the sheath means, and,
   elastomeric dampening means disposed between the sheath means and sensor body and supporting the sensor body relative to the sheath means for dampening vibrations of the sensor body relative to the sheath means.

3. An improved sensor as claimed in claim 2 wherein the sensor body is of cantilever construction.

4. An improved sensor as claimed in claim 1 wherein the elastomeric dampening means comprises at least one preformed elastomer located proximate to the second end of the sheath means.

5. An improved sensor as claimed in claim 4 wherein the elastomeric dampening means comprises at least one elastomeric "O" ring.

6. An improved sensor as claimed in claim 5 wherein the elastomeric dampening means comprises two "O" rings.

7. An improved sensor as claimed in claim 2 wherein the elastomeric dampening means has a Durometer hardness of 60 to 95 at the desired operating conditions.

8. An improved sensor as claimed in claim 2 wherein the elastomeric dampening means is selected from the group of materials consisting of fluorocarbon, fluorosilicone, silicone and a room temperature vulcanizing elastomer.

9. An improved sensor as claimed in claim 2 wherein the sheath means has a length that is between one third and one half the unsupported length of the sensor body.

10. An improved sensor as claimed in claim 4 wherein port means through the sheath means for equalizing the pressure in the space defined between the sheath means and the sensor body with the environment in which the sensor is disposed, the port means located between the mounting point to the supporting structure and the preformed elastomeric dampening means.

11. An improved sensor as claimed in claim 4 wherein the sheath means comprises a tube having an inner surface and an outer surface, the inner surface having an inward facing shoulder proximate its end, the end of the sheath means rolled inward to define a reduced diameter, the rolled end and shoulder in cooperation with a portion of the sheath and a portion of the sensor body, defining a slot for retaining the elastomeric dampening means.

12. An improved sensor as claimed in claim 2 wherein the sheath means and sensor body define a space therebetween, the elastomeric dampening means comprising a room temperature vulcanizing elastomer substantially filling such space.

13. An improved sensor having an elongated sensor body, the sensor body having a first end and a second end and being mounted rigidly to a supporting structure subject to vibrations at such ends and having a certain unsupported length therebetween wherein the improvement comprises:

first sheath means rigidly mounted to the supporting structure proximate to the first end of the sensor body, second sheath means rigidly mounted to the supporting structure proximate the second end of the sensor body, each such sheath means being subjected to vibrations of the supporting structure and each sheath means substantially enclosing a portion of the sensor body and being spaced from the corresponding portion of the sensor body for rigidly supporting elastomeric dampening means, elastomeric dampening means disposed between the first sheath means and a corresponding portion of the sensor body and between the second sheath means and a corresponding portion of the sensor body for dampening the vibration of the sensor body.

14. The sensor as claimed in claim 1, wherein the temperature sensor means is a cantilever, having a first end surrounded by said sheath means, and the second end being unsupported with respect to any supporting structure.

15. The sensor of claim 1, wherein the elastomeric dampening means has a durometer hardness of 60 to 95 at the desired operating condition and is selected from the group of materials consisting of fluorocarbon, fluorosilicone, silicone and a room temperature vulcanizing elastomer.

* * * * *